United States Patent Office 3,376,710
Patented Apr. 9, 1968

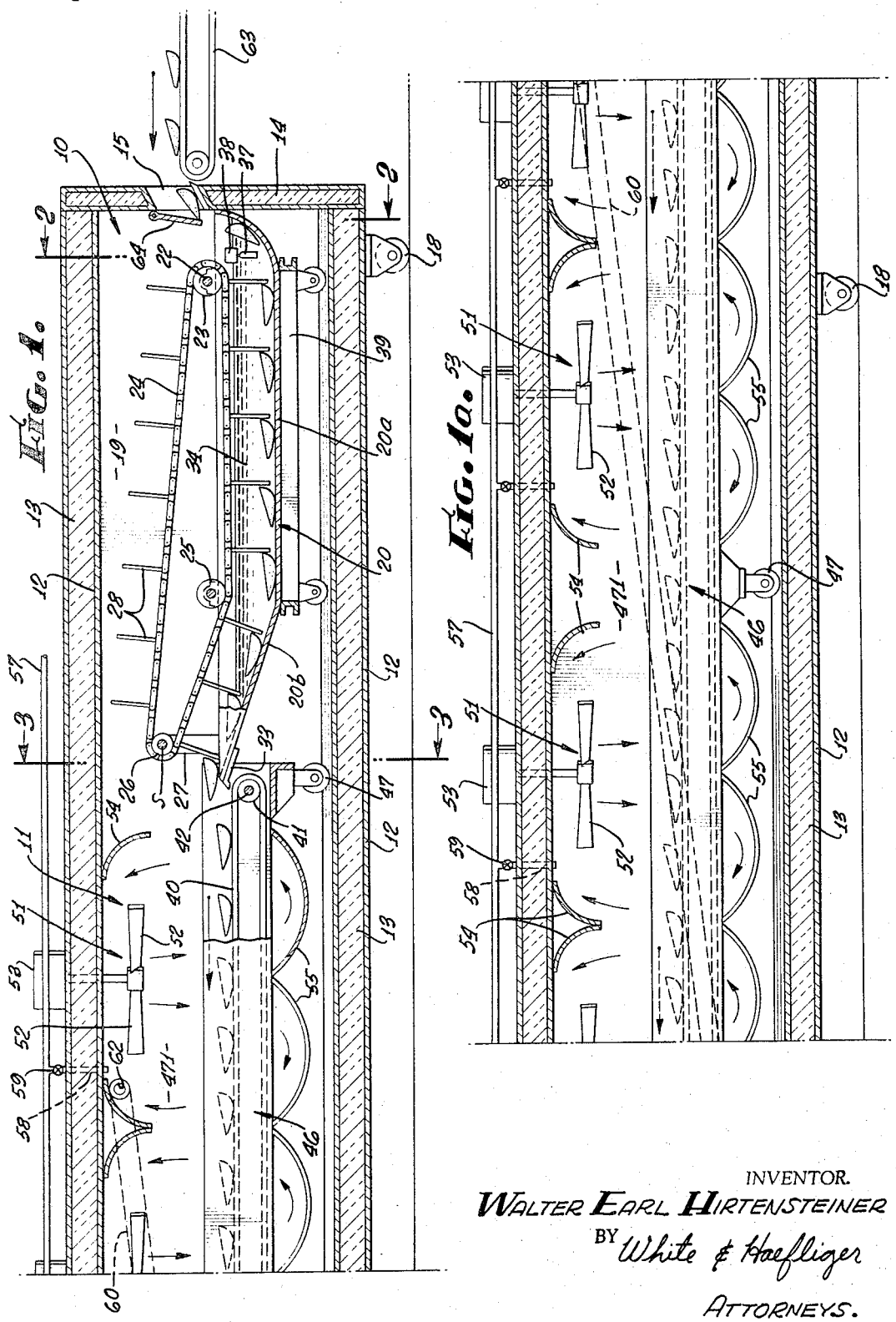

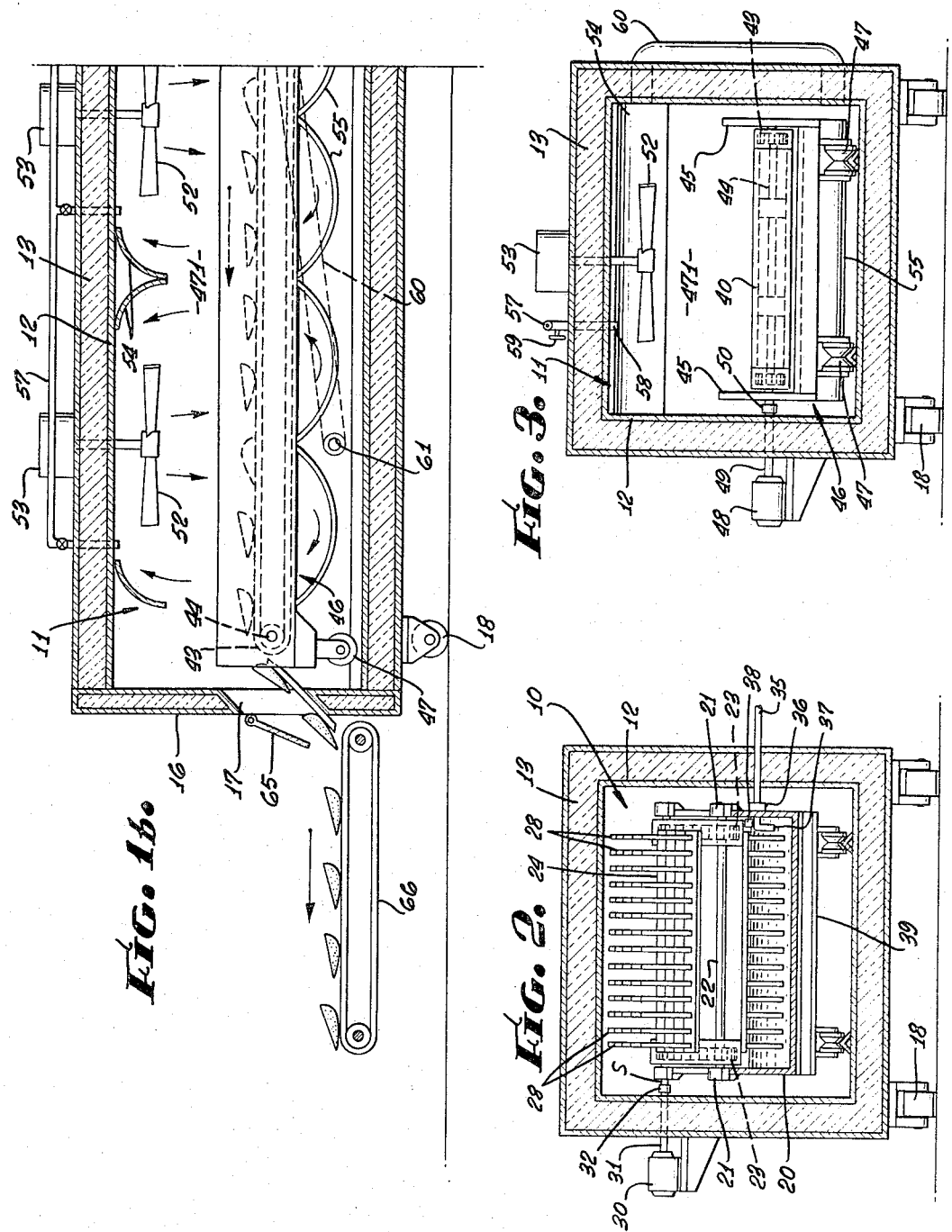

3,376,710
FOOD FREEZING APPARATUS
Walter Earl Hirtensteiner, 15051 Eastvale Road,
Poway, Calif. 92064
Continuation of application Ser. No. 350,249, Mar. 9,
1964. This application May 16, 1966, Ser. No. 560,358
18 Claims. (Cl. 62—374)

ABSTRACT OF THE DISCLOSURE

The invention is directed to equipment for low temperature freezing of food products, utilizing e.g. cold nitrogen, wherein the product is conveyed through an elongated chamber wherein cold gaseous coolant being evolved from its liquid state, as in a first product-liquid coolant contacting stage, is repeatedly circulated against the product at successive locations along and transversely of the path of its advancement thus to maintain high rates of product-to-gas heat transfer resulting in desirably rapid freezing of the product and efficient utilization of the heat absorption capacity of the gas.

---

This application is a continuation of my copending application Ser. No. 350,249, filed Mar. 9, 1964, now abandoned, on "Food Freezing Apparatus."

This invention relates generally to equipment designed for low temperature cooling or freezing of natural or prepared food products, and is directed particularly to improved apparatus that may be efficiently used for food freezing by contact with liquid and gaseous nitrogen. As illustrative, nitrogen will be referred to herein as the coolant.

One general object of the invention is to provide for two stage cooling of a selected food, initially by contact with liquid nitrogen in a first stage insulated chamber, and then by contact in a second stage insulated chamber with gas evolved from the first stage liquid and which is maintained in high velocity circulation. Employing this basic environment, the invention contemplates overall and rapid cooling of the food in a manner utilizing with high efficiency the cooling potential of the nitrogen in relation to frozen product to be brought down to desired or predetermined temperature.

Briefly, such cooling efficiency and utilization of the cooling capacity of the nitrogen are accomplished by providing for first stage maintenance under controllable conditions of high rates of liquid-to-solid heat transfer calculated to produce rapid initial cooling, and continuing the cooling at rates as rapidly as may be accomplished in the second stage, by mechanically displacing the gas against the advancing product at successive locations along its path of movement and transversely thereof so that the gas is locally circulated and maintained at such locations (allowing for relatively small net flow rate through the chamber) to maximize the time-temperature cooling potential of the gas at such locations and thereby maintain the most efficient cooling gradient throughout the chamber.

Other and more particularized objects of the invention have to do with features and details of the second stage cooling. Structurally, the invention contemplates providing the second cooling chamber in elongated form through which food to be cooled is advanced on a conveyor at controlled rate. Provision is made for circulating the cold gas at successive and any suitable number of locations along the correspondingly elongated chamber, by the use of fans or blowers positioned to displace the gas against the food at velocities in about the 1500 to 3000 feet per minute range with the gas flow being directed or baffled to recirculate repeatedly through and in rapid heat transference with the advancing food.

The invention has other elective features such as provisions for gas recirculation in the second stage chamber, flashing of liquid nitrogen directly into the chamber, accommodation of conveyor means for removal from either or both chambers, and construction of the entire equipment to be transportable at different locations.

Those mentioned, as well as additional objects of the invention, as well as the details of a typical and illustrative embodiment, will be more fully understood from the following detailed description of the accompanying drawings, in which:

FIGS. 1, 1a and 1b are views continuing leftward in that order, showing the freezing equipment in longitudinal section, together with diagrammatically illustrated appurtenant equipment at the feed and discharge ends; and FIGS. 2 and 3 are cross sections taken respectively on lines 2—2 and 3—3 of FIG. 1.

Generally considered, the freezing equipment may be regarded as comprising a first stage, generally indicated at 10, wherein the produce or other food to be frozen is subjected to initial cooling by contact with liquid coolant, and a second freezing stage generally indicated at 11, wherein the product undergoes continuing cooling and freezing by contact with gas evolved from the first stage liquid and which is circulated in high velocity contact with the produce. Both stages may conveniently be accommodated in a single elongated chamber defined by walls 12 encased within a thermal insulating jacket 13 so composed as to minimize atmospheric heat transfer into the cooling zones. During operation, the inlet end of the chamber is closed by a removable insulation closure 14 having a produce inlet opening 15, and the opposite end of the extended chamber has a similar removable closure 16 containing a produce discharge opening 17. It may be desirable to adapt the entire cooling chamber structure to be movable or transportable for use at different locations, for which purposes the structure may be suitably mounted on wheels or casters 18.

Referring particularly to the first freezing stage 10, the corresponding chamber extent 19 is shown to contain an elongated open vessel 20 on the sides (FIG. 2) of which are journaled at 21 a shaft 22 keyed to rolls or sprockets 23 which carry an endless reticulated belt 24 passing over idler rolls or sprockets 25 mounted on the sides of the vessel 20, and rolls or sprockets 26 mounted on the vessel-carried supports 27 and driven by shafts. The belt 24 carries a succession of transverse rows of fingers which function as pushers to advance the produce through the vessel 20. Preferably, the body of the belt 24 is non-metallic and has plastic or resin segments of nylon, Teflon or the like which obviate expansion and contraction difficulties in a metallic belt or conveyor subjected to the extremely low temperature of the liquid bath. The pusher fingers 28 however may be metallic. Due to the low chamber temperature, shaft S is driven from the outside by motor 30 whose shaft 31 is disconnectably coupled at 32 to the belt drive shaft. As illustrated in FIG. 1, the vessel 20 has at 20a an essentially horizontal extent beyond which the bottom inclines upwardly at 20b to a discharge lip 33 overlying the later described gas cooling chamber conveyor. Any suitable provision may be made for feeding into and maintaining a body 34 of the liquid coolant in vessel 20. Merely as illustrative, the coolant may be introduced through line 35 releasably coupled at 36 to inlet 37 positioned inside the vessel and having associated therewith an appropriate liquid level control diagrammatically indicated at 38. It is desirable that the vessel and conveyor assembly be removable from the chamber 19 for any of such purposes as cleaning, replacement or repair of parts. Accordingly the vessel 20 is shown to be mounted on a wheeled carriage 39 so that upon disconnection of couplings 32 and 36 and removal of the end closure 14, the vessel and conveyor structure may be pulled out of the chamber.

Low temperature gas released from the liquid bath 34 passes forwardly into the atmosphere of the second cooling stage 11 wherein the produce advances on an elongated conveyor 40 which may be of any suitable construction and is shown diagrammatically to be carried on sprockets 41 carried by shaft 42, the opposite end of the conveyor belt passing over sprockets 42 and driven by shaft 44. The conveyor may be supported by any suitable number of intermediate sprockets or rolls. Referring to FIG. 3, the conveyor shafts extend between and are supported by the sides 45 of an appropriate frame structure generally denoted at 46 and which may be mounted on wheels 47 to permit removal of the conveyor and later described frame mounted baffles from the second stage chamber 471 after removal of the end closure 16. Shaft 44 is driven from the outside by motor 48 whose shaft 49 is releasably coupled at 50 to the conveyor drive.

Provision is made at successive locations generally indicated at 51 within chamber 471, and of which there may be any suitable number, for circulating the first stage gas effluent in repeated high velocity contact with the produce on the conveyor 10 at the individual stages 51, while maintaining a relatively low net flow of the gas through the chamber. Each of the stages 51 employs a fan or blower of suitable design and conventionally illustrated at 52 driven by motor 53 mounted on top of the chamber structure. The fan displaces the cold gas downwardly against and through the produce on the conveyor. Baffles 54, concave in relation to the fan, extend transversely across the rectangular chamber 471 and serve to direct to the fan the gas return displacement in the direction of the arrows in FIG. 1a. Directly beneath each fan and baffles 54, the conveyor frame structure 46 mounts a pair of downwardly concave transversely extending baffles 55 which, in accordance with the arrows, direct the fan displacement that has passed through the produce, outwardly and upwardly and again through the produce so that the bulk of the chamber gas at any one of the locations 51 undergoes repeated recirculation through and in contact with the produce being frozen. To achieve the objectives of high transfer rates of heat from the produce to the gas, the fans 52 are so designed and given variable operating speeds to maintain the produce contacting velocity of the gas at high rates as in the range of about 1500 to 3000 feet per minute. Thus at each stage 51 there is maximized the cooling potential of the gas by its high velocity retention, and the stage succession is caused to operate at progressively reducing temperature gradient runnning through the chamber to as practicably high a temperature as may be desired at the outlet 17, say in the order of 0° F. to −100° F., goverened by the net gas flow through the chamber. Such flow is controllable in any suitable manner as by the area relation of the inlet 15 to the outlet 17, where the latter is larger and therefore the total gas flow is to the outlet.

Whereas ordinarily, the cooling capacity of the gas evolved from the first stage liquid will suffice to reduce the temperature in chamber 471 of the produce throughout well below 0° F., provision may be made to implement the second stage cooling capacity as by flashing extraneous liquid coolant at one or more locations in the second chamber atmosphere. Thus diagrammatically, liquid normally gaseous coolant supplied through line 57 may be released through outlets 58 under control of valves 59 at one or more locations within chamber 471. Also it may be desirable to provide for recirculation of gas within the chamber, for which purpose I may provide at one or both sides thereof ducts 60 leading from locations at 61 near the outlet end of the chamber to return inlets at 62 toward or near the inlet end of the chamber and in such relation to one of the fans 52 that gas displacement by the latter will induce the return flow duct 60.

In brief reference to operation, the food or produce to be frozen may be fed on conveyor 63 through inlet 15 which may or may not have a pivoted closure 64 displaceable by the produce. The latter drops into the liquid coolant bath 34 and is advanced therein by the pushers 28 at a rate governed by the length of time required or desired for that initial extent of cooling by direct contact with the liquid coolant at high solid-to-liquid heat transfer rates. Upon advancement out of the bath the produce is carried forward on conveyor 10 again at a controlled rate governed by the ultimately desired temperature to which the produce is to be frozen throughout, in relation to the effective gas cooling potential governed in general by the maintained produce-to-gas heat transfer rates, the net gas flow through the chamber and the controlled gas outlet temperature. From conveyor 10 the produce is discharged through outlet 17 which may or may not have a displaceable closure 65, onto conveyor 66 for any desired further treatment to be given the frozen produce.

I claim:
1. Food freezing equipment comprising
   (A) walls forming a chamber structure including a first thermally insulated chamber section and,
   (B) a second thermally insulated chamber section in communication with said first chamber section,
   (C) means for advancing a food product in a path through the first section and then in a path through the second section,
   (D) means for contacting the product with low boiling normally gaseous liquid coolant in said first chamber section whereby the product is subject to initial cooling with resultant vaporization of gas from the liquid into and through said second chamber section, and
   (E) mechanical means in the second chamber to positively displace and repeatedly circulate said gas therein across the food product path in high velocity contact with the product advancing therethrough to continue the product cooling.

2. Equipment according to claim 1, in which said means (D) comprises means for contacting the product with liquid nitrogen from which cold nitrogen gas is evolved into the second chamber section for flow therethrough in the direction of the product advancement therein.

3. Equipment according to claim 1, in which said means (D) comprises a vessel containing a bath of liquid nitrogen, and conveyor means operating to advance the product while submerged in said bath.

4. Equipment according to claim 1, in which said means (E) comprises fan and baffle means in said second chamber section operating to direct and circulate the gas downwardly and upwardly repeatedly in the same flow pattern through the path of advancement of the product therein.

5. Equipment according to claim 1, in which said second chamber section is elongated and horizontally extended from the first section, said second section containing conveyor means operable to advance the product therethrough, said means (E) comprising means operating to repeatedly circulate the gas downwardly and upwardly through the path of advancement of the product at each of successive locations along said path.

6. Equipment according to claim 5, in which said circulating means comprise a plurality of fans at said locations, and baffle means associated with each fan above and below the conveyor means for directing the gas in successive paths of recirculation downwardly and upwardly through the produce being advanced by the conveyor means.

7. Equipment according to claim 6, in which said baffle means comprise upper opposed concave baffles at opposite sides of each fan above the conveyor means, and downwardly concave return circulation baffles below the conveyor means and in the path of gas displaced by the fan.

8. Equipment according to claim 5, including also means for recirculating gas from a location toward the outlet end of said second chamber section to a lower temperature location toward its inlet end.

9. Equipment according to claim 5, including means for introducing liquid coolant into said second chamber section for vaporization therein.

10. Equipment according to claim 6, in which said circulating means includes motors outside said second chamber and operating to drive said fans at speeds circulating the gas in contact with the product at a velocity between about 1500 and 3000 feet per minute.

11. Equipment according to claim 6, including also a wheeled carriage mounting said conveyor means and baffles therebelow in the second chamber section for removal therefrom.

12. Food freezing equipment comprising,
 (A) walls forming an elongated thermally insulated chamber,
 (B) conveyor means for receiving and advancing a food product through the chamber,
 (C) fans at successive locations longitudinally of the chamber,
 (D) means associated with each of the fans for directing the gas displacement by the fans repeatedly at each fan location and corresponding location within the chamber before the gas passes to the next fan and chamber location, whereby the gas is maintained in respective recirculating paths of flow through the conveyor means and in contact with the product on said conveyor means, and
 (E) means for feeding low temperature nitrogen gas being evolved from liquid nitrogen into the atmosphere of said chamber for flow therethrough and recirculation by the fans.

13. Equipment according to claim 12, in which said means (D) includes baffles positioned beneath each fan and the conveyor means to direct and recycle the gas reversely back to the fan through the conveyor means.

14. Equipment according to claim 13, in which said baffle means also includes baffles positioned at each side of each fan to direct the gas downwardly through the conveyor means.

15. Equipment according to claim 14, in which said chamber is essentially rectangular in cross section and the fans are positioned along the top of the chamber.

16. Equipment according to claim 12, in which said fans and means (D) operate to project the gas in contact with the product downwardly through the conveyor means and portions of the gas are recirculated to the fans while a flow of the gas passes through the chamber.

17. Equipment according to claim 12, in which said means (E) includes means for vaporizing liquid nitrogen to supply said low temperature gas to the inlet end of the chamber, said chamber having a product outlet end through which the gas escapes to atmosphere.

18. Equipment according to claim 12, in which said means (E) includes means for flash vaporizing liquid nitrogen directly into the chamber atmosphere.

References Cited

UNITED STATES PATENTS

| | | | |
|---|---|---|---|
| 2,059,970 | 11/1936 | Robillard | 62—374 X |
| 2,237,256 | 4/1941 | Finnegan | 62—380 X |
| 2,447,249 | 8/1948 | Hill | 62—63 |
| 2,527,542 | 10/1950 | Gilson | 62—380 X |
| 2,680,957 | 6/1954 | Adams | 62—237 |
| 2,951,353 | 9/1960 | Morrison | 62—380 X |
| 3,139,739 | 7/1964 | Robinson | 62—380 X |
| 3,166,425 | 1/1965 | Morrison | 62—374 X |
| 3,238,736 | 3/1966 | Macintosh | 62—63 |
| 3,258,935 | 7/1966 | Ross | 62—374 |

EDWARD J. MICHAEL, *Primary Examiner.*